(12) United States Patent
Kiyohara et al.

(10) Patent No.: US 12,511,895 B2
(45) Date of Patent: Dec. 30, 2025

(54) IMAGE RECOGNITION SYSTEM

(71) Applicant: HITACHI, LTD., Tokyo (JP)

(72) Inventors: Masahiro Kiyohara, Tokyo (JP); Haruki Matono, Tokyo (JP); Hideaki Kido, Tokyo (JP); Takeshi Endo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/708,642

(22) PCT Filed: Oct. 24, 2022

(86) PCT No.: PCT/JP2022/039592
§ 371 (c)(1),
(2) Date: May 9, 2024

(87) PCT Pub. No.: WO2023/090067
PCT Pub. Date: May 25, 2023

(65) Prior Publication Data
US 2025/0014327 A1    Jan. 9, 2025

(30) Foreign Application Priority Data

Nov. 17, 2021  (JP) ................. 2021-186800

(51) Int. Cl.
*H04N 9/73*     (2023.01)
*G06K 9/00*     (2022.01)
(Continued)

(52) U.S. Cl.
CPC ............ *G06V 10/993* (2022.01); *G06V 20/56* (2022.01); *H04N 17/002* (2013.01); *H04N 23/64* (2023.01)

(58) Field of Classification Search
CPC .... G06V 10/993; G06V 20/56; H04N 17/002; H04N 23/64; H04N 23/60; G03B 15/00
See application file for complete search history.

(56) References Cited

U.S. PATENT DOCUMENTS

2018/0374360 A1* 12/2018 Miao ................. G08G 1/163
2019/0220029 A1*  7/2019 Fukuhara .......... G06T 15/005
(Continued)

FOREIGN PATENT DOCUMENTS

JP     2015-192222 A   11/2015
JP        6045888 B2   12/2016
(Continued)

OTHER PUBLICATIONS

International Search Report of PCT/JP2022/039592 dated Dec. 20, 2022.

*Primary Examiner* — Howard D Brown, Jr.
(74) *Attorney, Agent, or Firm* — MATTINGLY & MALUR, PC (57) ABSTRACT

The present invention optimizes conditions of an imaging device when acquiring an image so as to improve the accuracy of image recognition. An image recognition system comprises: an image acquisition unit for acquiring an image captured by an imaging device; a recognition model generation unit having at least one environment recognition unit, recognizing at least one image by the environment recognition unit, and generating a recognition model; and a state estimation unit for estimating the state of the imaging device and the characteristic of the imaging device that corresponds to said state, on the basis of the image and the recognition model. The state estimation unit further generates an imaging correction parameter to correct the imaging condition of the imaging device, on the basis of the estimated state and characteristic and/or the recognition model.

6 Claims, 6 Drawing Sheets

(51) Int. Cl.
*G06V 10/98* (2022.01)
*G06V 20/56* (2022.01)
*H04N 17/00* (2006.01)
*H04N 23/60* (2023.01)

(56) References Cited

U.S. PATENT DOCUMENTS

| | | | |
|---|---|---|---|
| 2020/0014898 A1* | 1/2020 | Imai | H04N 23/11 |
| 2021/0237726 A1* | 8/2021 | Ishibashi | B60W 30/14 |
| 2021/0241028 A1* | 8/2021 | Hojin | B60W 30/143 |
| 2022/0124290 A1* | 4/2022 | Nagao | H04N 23/66 |

FOREIGN PATENT DOCUMENTS

| | | |
|---|---|---|
| JP | 2018-164199 A | 10/2018 |
| JP | 2019-125116 A | 7/2019 |
| JP | 2021-061546 A | 4/2021 |

* cited by examiner

IMAGE RECOGNITION SYSTEM

TECHNICAL FIELD

The present invention relates to an image recognition technology and particularly to an image recognition system incorporated in a mobile body that moves while recognizing the surroundings, such as a driving assistance system, an automatic driving system, and an autonomous mobile robot.

BACKGROUND ART

In recent years, an image recognition technology incorporated in a mobile body is required to have robustness against environmental changes and environmental disturbances. For example, environmental changes may occur, depending on places where a mobile body is traveling, the environmental changes including a drop in the sharpness of contrast that results when a recognition target is not properly exposed to illumination light, and image-capturing with hue variations that is caused by different types of light sources, such as sunlight, a halogen lamp, and a neon sign.

Various environmental disturbances may arise in an indoor environment, where backlight created by light from the setting sun that passes through a window, etc., or light from such a light source as a PC monitor is a disturbance factor, and arise also in an outdoor environment, where raindrops sticking to a camera lens and dark noise generated during nighttime operation are disturbance factors. Besides, the dynamic range of an imaging element of a camera poses a limitation and not being able to select the convenient installation location of the camera for image recognition is another limitation. In this manner, in image recognition using an imaging device, recognition performance drops due to environmental changes and environmental disturbances. In other words, in implementation of the image recognition technology, the recognition performance in recognizing an object drops in a state different from an image-capturing state that is assumed at the time of constructing an image recognition process.

For example, PTL 1 provides a technique including: "a first acquisition unit that acquires an image-taking condition under which an image used for generating a learning model has been taken, an input means that inputs a taken-image to be processed, the taken-image being from an imaging device, a second acquisition unit that acquires an image-taking condition under which the taken-image to be processed has been taken, and a conversion unit that converts the taken-image to be processed, based on the image-taking conditions acquired by the first and second acquisition units". According to the technique, an input image is converted in such a way as to bring it closer to an image-capturing state that is assumed when an image recognition process is constructed, and therefore, even when image-taking conditions do not match between an environment in which learning is performed in advance and an environment in which image recognition is actually carried out, the accuracy of image recognition is improved.

CITATION LIST

Patent Literature

PTL 1: JP 2019-125116 A
PTL 2: JP 6045888 B2

SUMMARY OF INVENTION

Technical Problem

The above-described conventional technology is executed on the assumption that an image-capturing condition for an image used for learning is constant and that an image-capturing condition under which an image has been actually taken can be matched to an image-capturing condition under which learning is performed, by conversion of a taken-image. However, a mobile body, typical examples of which are a driving assist system, an automatic driving system, an autonomous mobile robot, and the like, is assumed to move in various places, and in many cases, the mobile body uses images for learning that are collected under various image-capturing conditions, which may lead to a case where learning using images acquired in the same environment is not performed for a plurality of types of recognition targets. In addition, because of the assumption that the accuracy of image recognition is improved by converting an acquired image, the accuracy of image recognition cannot be sufficiently improved in a case where an image acquired by an imaging device is already missing some information or having some information degenerated.

The present invention has been conceived from the viewpoint of giving importance not to adapting to an environment at the time of learning for image recognition, as in the above-described conventional technology, but to adapting to an environment in which the performance of a device or the like used for image recognition appears, and an object of the invention is to provide an image recognition system that can improve the accuracy of image recognition by optimizing a condition for an imaging device at the time of image acquisition.

Solution to Problem

In order to solve the above problems, an image recognition system of the present invention includes: an image acquisition unit that includes a processor and a memory, the image acquisition unit acquiring an image taken by an imaging device; a recognition model generation unit including at least one environment recognition unit, the recognition model generation unit recognizing an image by at least one environment recognition unit and generating a recognition model; and a state estimation unit that estimates a state of the imaging device and a characteristic of the imaging device, the characteristic corresponding to the state, based on the image and the recognition model. The state estimation unit generates an image-capturing correction parameter for correcting an image-capturing condition for the imaging device, based on at least one of the estimated state, the estimated characteristic, and the recognition model.

Advantageous Effects of Invention

The present invention makes it possible to improve the accuracy of image recognition by optimizing a condition for an imaging device at the time of image acquisition. Other features related to the present invention will be made clear by the descriptive contents of this specification and the accompanying drawings. Problems, configurations, and effects that are not described above will be clarified by the following description of embodiments.

DESCRIPTION OF EMBODIMENTS

Hereinafter, embodiments of an image recognition system according to the present invention will be described with reference to the drawings, as examples in which the image recognition system is applied to an in-vehicle camera.

First Embodiment

Figure 1:
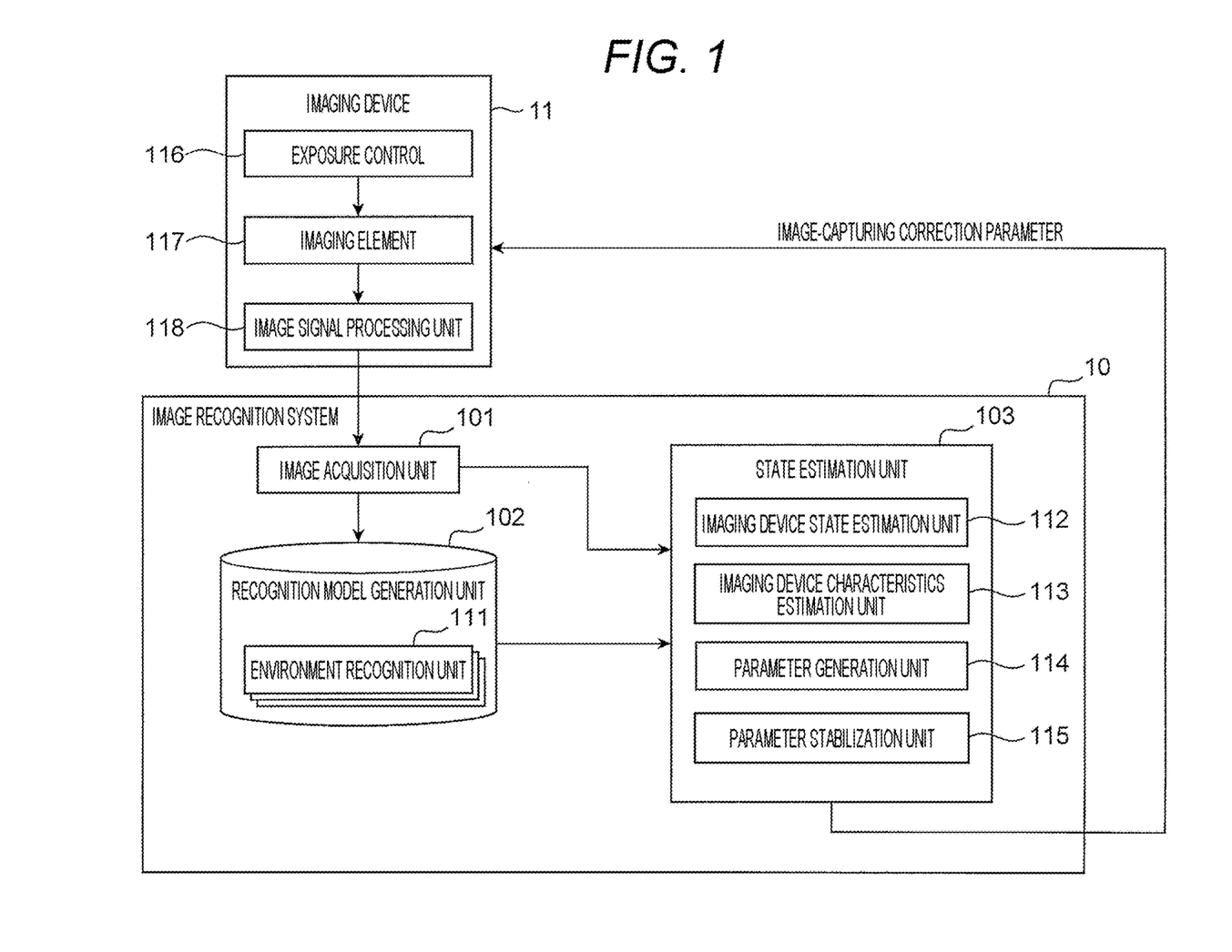
FIG. 1 is a block configuration diagram showing a connection relationship between functional blocks of an image recognition system according to a first embodiment.

FIG. 1 is a block configuration diagram for explaining each of functional blocks of an image recognition system 10 according to a first embodiment of the present invention.

As shown in FIG. 1, the image recognition system 10 is connected to an imaging device 11 via a wired or wireless network, and receives image-capturing data and image-capturing parameters from the imaging device 11. Based on these received data, the image recognition system 10 generates an image-capturing correction parameter for correcting an image-capturing condition for the imaging device, and transmits the image-capturing correction parameter to the imaging device 11, as feedback.

At the imaging device 11, an exposure control unit 116 controls a shutter open time and an aperture open degree, and allows an image to pass through the inside of the imaging device 11 via a condenser element, such as a lens, only for a certain period of time. The imaging device 11 has an imaging element 117 (which referred to also as a photoelectric element or an imager) built therein. An external image signal passes through the lens and is received by this imaging element 117, which turns the image signal into a charge. A charge generated at each part of the imaging element 117 is subjected to image signal processing by an image signal processing unit 118 (which is referred to also as an image signal processor (ISP)), the image signal processing including gain adjustment, smoothing, edge enhancement, demosaicing, noise removal, white balance adjustment, high dynamic range (HDR) processing, and, when necessary, bitwidth reduction (conversion to 24-bit/pixel or the like) that are carried out based on an image signal processing parameter. Data subjected to the image signal processing is transmitted to the image recognition system 10, as image data. At this time, the imaging device 11 may transmit an image-capturing parameter at the time of image acquisition and an observation parameter, such as an exposure value, together with the image data, to the image recognition system.

The image recognition system 10 includes an image acquisition unit 101, a recognition model generation unit 102, and a state estimation unit 103. The recognition model generation unit 102 includes a plurality of environment recognition units 111. The state estimation unit 103 includes an imaging device state estimation unit 112, an imaging device characteristics estimation unit 113, a parameter generation unit 114, and a parameter stabilization unit 115.

It should be noted that although the imaging device 11 and the image recognition system 10 are illustrated separately in FIG. 1, they may be mounted on the same hardware, or, conversely, one or more of the image acquisition unit 101, the recognition model generation unit 102, and the state estimation unit 103 included in the image recognition system 10 may be mounted separately on a different piece of hardware and operate in cooperation with other units through communication or the like.

Specifically, the image recognition system 10 is an electronic control unit (ECU) including such pieces of hardware as an arithmetic device (processor) like a CPU, a main storage device like a semiconductor memory, an auxiliary storage device, and a communication device, and implements each functional unit, such as the recognition model generation unit 102 and the state estimation unit 103, by causing the arithmetic device to execute a program loaded onto the main storage device. Hereinafter, as description of such a known technique in the computer field is omitted on a necessary basis, each unit will be described in detail.

In the image recognition system 10, image data or the like received from the imaging device 11 is acquired by the image acquisition unit 101, is stored in a memory or the like (not illustrated), and is outputted to the recognition model generation unit 102 and to the state estimation unit 103.

The recognition model generation unit 102 has one or more environment recognition units 111 incorporated therein, receives image data from the image acquisition unit, as input, recognizes the image data, based on a recognition model obtained in advance by learning or designed manually, and outputs the result of image recognition. The recognition model mentioned here refers to a model that contains information on recognition targets including mobile bodies, such as other vehicles, pedestrians, motorcycles, bicycles, and animals, objects installed in the environment, such as traffic lights/signs, signboards, and bus stops, road markings, such as lane division lines, temporary stop lines, side strips, safety zones, instruction markings, and regulation markings, structures, such as walls, fences, utility poles, curbs, and buildings, obstacles, such as fallen stones and tires, and road surface conditions, such as uneven road surfaces, road gradients, and dry or humid conditions, so that, in a case where this system is applied to an in-vehicle camera incorporated in an automatic driving system, for example, the environment recognition unit 111 is able to recognize one or more of these recognition targets.

The recognition model generation unit 102 causes each environment recognition unit 111 to carry out external environment recognition, and outputs recognition results, such as a rectangular area of an area obtained as a recognition result, a center point, a size, a degree of recognition certainty, a type of a recognition target, and an attribute of a recognized target, to the state estimation unit 103.

The state estimation unit 103 receives image data and the like from the image acquisition unit 101 and receives recognition results and the like from the recognition model generation unit 102, generates an image-capturing correction parameter for correcting an image-capturing condition for the imaging device 11 on the basis of these received data, and transmits the image-capturing correction parameter to the imaging device 11. According to the present invention, correction of an image-capturing condition refers to, for example, correction of one or more of these image-capturing correction parameters: a shutter open time, an aperture open degree, and an image signal processing parameter of the imaging device.

The state estimation unit 103 includes an imaging device state estimation unit 112, an imaging device characteristics estimation unit 113, a parameter generation unit 114, and a parameter stabilization unit 115.

Based on received image data and the like, the imaging device state estimation unit 112 estimates states of the imaging device including one or more of raindrops sticking to the lens, a state of shielding or exposure by haze or wiper movement, and the like. It can be said, therefore, that a state of the imaging device collectively refers to an event that occurs at the imaging device because of an environment in which the imaging device is in (external factors, such as weather, temperature, humidity, and interference by a nearby object).

The imaging device characteristics estimation unit 113 estimates characteristics of the imaging device including one or more of the sensitivity and the signal noise ratio (SN ratio) of the imaging element 117, the sensitivity and the SN ratio of each pixel of the imaging element 117, lens characteristics, such as a blur amount and a distortion amount, of the imaging device11, and color correction characteristics, such as a white balance characteristic and a gain characteristic. It can be said, therefore, that characteristics of the imaging device, contrary to the reference to the state of the imaging device, collectively refer to events that occur at the imaging device because of the functions of internal elements themselves making up the imaging device, such as a light-receiving element and a processing circuit.

Based on results outputted from the imaging device state estimation unit 112, the imaging device characteristics estimation unit 113, and the recognition model generation unit 102, the parameter generation unit 114 calculates an image-capturing correction parameter for correction of one or more of a shutter open time, an aperture open degree, and an image signal processing parameter, and an influence on a recognition result of the recognition model generation unit 102.

Based on one or both of a time-series change in the image-capturing correction parameter calculated by the parameter generation unit 114 and the influence on the recognition result of the recognition model generation unit 102, the parameter stabilization unit 115 monitors the image-capturing correction parameter to see whether it is in an unstable state, such as a state of hunting, and finally determines an image-capturing correction parameter to be outputted to the imaging device 11.

An outline of a series of the above-mentioned processes carried out by the recognition model generation unit 102, the imaging device state estimation unit 112, the imaging device characteristics estimation unit 113, and the parameter generation unit 114 will be described with reference to FIG. 2.

Figure 2:
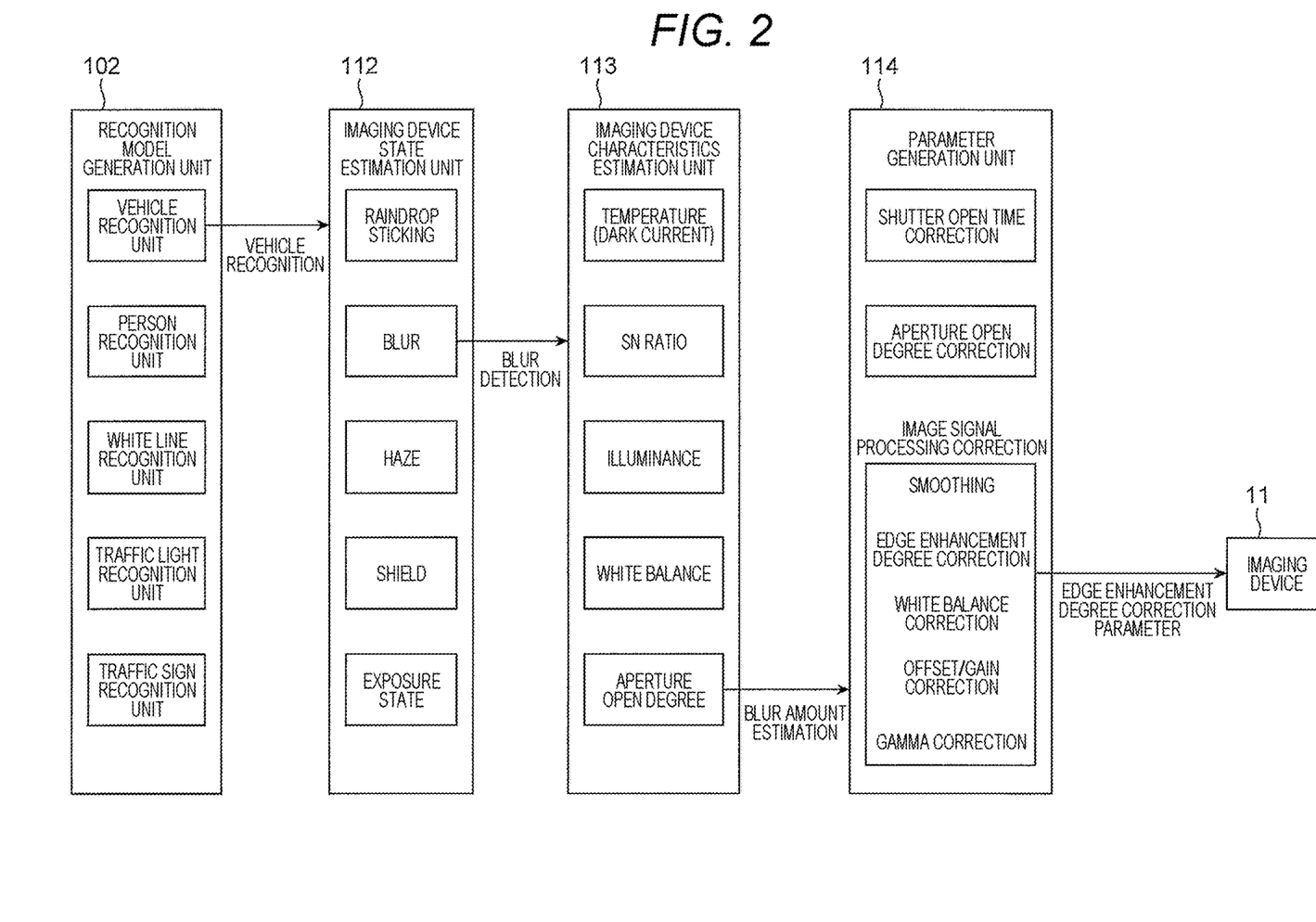
FIG. 2 is a block diagram showing an outline of image-capturing correction parameter generation by the image recognition system according to the present invention.

An example in which, as shown in FIG. 2, a vehicle recognition unit plurality of environment among the recognition units included in the recognition model generation unit 102 recognizes a vehicle in a certain area in an image acquired by the image acquisition unit will be described.

It is assumed that the vehicle recognition unit transmits vehicle recognition information, together with the image acquired by the image acquisition unit 101, to the imaging device state estimation unit 112, where a "blur" is detected in the area where the vehicle is recognized.

Information on the detected blur is then transmitted to the imaging device characteristics estimation unit 113. The imaging device characteristics estimation unit 113 estimates a blur amount from information on an aperture open degree of the imaging device, the aperture open degree being the cause of the blur.

When the information on the blur amount is transmitted to the parameter generation unit 114, the parameter generation unit 114 generates an edge enhancement degree correction parameter from image signal processing correction parameters in order to correct the blur amount to a blur value with which the imaging device exerts its vehicle recognition performance normally, and feeds the blur value back to the imaging device 11 via the parameter stabilization unit 115 (not shown in FIG. 2).

Through a series of the above processes, even if the image-capturing environment changes due to traveling of the vehicle, weather changes, etc., and the state and characteristics of the imaging device change as a consequence, the imaging device 11 can monitor and correct such changes in real time and therefore can always perform image capturing under optimal conditions.

It should be noted that the example shown in FIG. 2 is one example of the above processes. When the environment recognition unit recognizes a different object, the same processes are carried out, and there may be a plurality of characteristics corresponding to each state and of parameters for correcting each characteristic. Each state, characteristic, and parameter will be described in detail later.

Hereinafter, each unit of the image recognition system according to the present invention will be described more specifically.

<Image Acquisition Unit 101>

The image acquisition unit 101 receives image data and image-capturing parameters sent from the imaging device 11, through such a communication means as a universal serial bus (USB), low voltage differential signaling (LVDS), inter-integrated circuit (I2C), or Ethernet. It is assumed that image data is obtained as, for example, a color image, such as RGB 888 image, or a gray-scale luminance image. It is assumed that image-capturing parameters include a shutter open time, an aperture open degree, and the like at the time of image capturing.

The image acquisition unit 101 receives image data and an image-capturing parameter, and stores them in a memory or the like (not illustrated). At this time, the image data and image-capturing parameter may be stored in association with time data uniquely set inside the image recognition system 10 or time data on the whole system. By storing the image data and image-capturing parameter in association with the time data, whether data is periodically transmitted from the imaging device or whether a delay occurs in a communication path or a transmission path can be found. In addition, at which time a calculation result of an image-capturing correction parameter, which will be described later, is associated with image-capturing data is also found. This allows the parameter stabilization unit 115, which will be described later, to output a more stable image-capturing correction parameter.

<Recognition Model Generation Unit 102>

The recognition model generation unit 102 recognizes a given recognition target, based on image data acquired from the image acquisition unit 101, and outputs a recognition result to the state estimation unit 103. Detailed description of this image recognition technology is omitted because many known techniques related to this technology are present. Nevertheless, some cases of an automatic driving system equipped with in-vehicle cameras will be described.

For a case where a recognition target is a mobile body or an installation object, a technique has been opened to the public, the technique using a convolutional neural network (CNN), which is a type of deep learning, and allowing acquisition of recognition results including the rectangular area, the center point, size, the certainty of recognition, the type, and the attribute of the recognition target included in an image. Such a technique may be used for this case.

For a case where a recognition target is a road marking, some known techniques are available, too. In this case, for example, by using the technique described in PTL 2 or the like, recognition results including the area, the center point, the size, and the type of the recognition target can be obtained. In addition, the certainty of recognition can be obtained based on the contrast and the amount of noise of an image of the road marking. Such a technique, therefore, may be used for this case.

Likewise, in a case where a recognition target is a structure or an obstacle, some known techniques are available, for example, when a stereo camera is used, the distance from the camera to the point corresponding to each point on an image can be calculated, based on a parallax between left and right camera units. It is also known that plane approximation of a point group of obtained distance information, the point group being on the lower side of the screen, allows calculation of a road plane, and that extracting points at certain distances or more from the road plane as a three-dimensional object allows calculation of a structure or an obstacle.

Also for a case where a recognition target is a road surface condition, a technique has been opened to the public, the technique using a convolutional neural network (CNN), which is a type of deep learning, to make estimations, based on texture in an image and continuity with the surroundings. Such a technique may be used for this case.

Individual recognition processes described above may be carried out by the plurality of environment recognition units 111 such that each environment recognition unit 111 is responsible for a recognition process on each recognition target. In such a case, image data and the image-capturing parameters from the image acquisition unit 101 are transmitted in parallel to the environment recognition units 111, that is, inputted in parallel to the environment recognition units 111.

Detailed functions of the imaging device state estimation unit 112, the imaging device characteristics estimation unit 113, the parameter generation unit 114, and the parameter stabilization unit 115 that are included in the state estimation unit 103 described above will then be described.

<Imaging Device State Estimation Unit 112>

Based on image data or the like received from the image acquisition unit 101, the imaging device state estimation unit 112 detects factors that changes an image-capturing condition for an image sensor, such as raindrops or mud sticking to a windshield or lens and a haze or blur occurring in the course of capturing of an image of a target object by an imaging element, detects intermittent shielding by a wiper blade that occurs during operation of a wiper, detects a change in an exposure state that occurs depending on a weather condition outside, a time zone, or artificial illumination, or acquires an adjustment value of an automatic exposure adjustment mechanism (AE) separately provided in the imaging device or a shutter speed value of an automatic shutter speed adjustment mechanism.

Hereinafter, some examples of detection methods will be described.

Sticking of raindrops or mud is detected in the following manner. In moving images that are acquired consecutively as the vehicle travels, variations in coordinates of feature points that can be extracted by a feature point extraction method, such as Harris, SIFT, or SURF, are observed in a time-series manner. This observation finds that the coordinates of the feature points smoothly change in an area where no raindrop is sticking, whereas the rate of variations in the coordinates of the feature points changes in a point close to a raindrop-sticking area. In other words, in the area where raindrops are sticking, the coordinates of the feature points change sharply or discontinuously. In a case where mud is sticking, extraction of the feature points fails at a point close to a mud-sticking area, and further tracking the feature points becomes impossible. By observing the rate of variations in the coordinates of the feature points and the success or failure of feature point extraction in such a manner, sticking of raindrops or mud can be detected. Further, by accumulating points of change of the rate of variations in the coordinates and points of change of the success or failure of feature point extraction, an area where raindrops or mud are sticking can be estimated.

Haze or blur is detected in the following manner. When image-capturing is performed as the vehicle moves, a target object appearing in an image captured at a certain moment is blurred to an extent corresponding to an amount of apparent movement during an exposure time. This phenomenon, which is called motion blur, has a little influence in a case where the exposure time is short and the target object is located sufficiently distant, in which case, therefore, a blur amount turns out be small. Additional blur amount corresponding to the spatial frequency characteristics of the lens that are expressed by a modulation transfer function (MTF) or the like is also present, and this blur is superimposed on the motion blur. Based on these facts, a frequency component of the captured image is analyzed, and when a frequency component higher than a threshold set with the above blur amount taken into consideration is not detected, it is determined that lens hazing has occurred due to factors other than motion blur and lens characteristics, that is, due to such factors as water vapor and dirt sticking. Because a hazing state of the lens hardly changes quickly, lens hazing is not determined instantaneously based on observation of a single image. Instead, frequency components are accumulated in a time-series manner and the occurrence of lens hazing may be determined when a high frequency component is not detected until a certain period of time elapses or a certain distance is traveled.

Shielding by the wiper blade is detected in the following manner. Because data on on/off states of a wiper switch and a wiper operation speed flows in an in-vehicle network, such as a controller area network (CAN), the content of such data is acquired to determine whether shielding by the wiper has occurred or not. In another case, given the fact that in what way or at what angle the wiper blade appears in the camera's field of view is known when the wipe blade operates, checking the shape of the wiper blade against a shape registered in advance by, for example, a template matching method allows detection of the wiper blade, and therefore at which point in an image the wiper blade is present can be determined.

An exposure state is detected in the following manner. By calculating statistics on pixels in an image, such as the average, variance, multimodal, and frequency components of the pixels, and comparing the statistics with a preset threshold, whether the vehicle is running in the daytime or nighttime or inside or outside a tunnel is determined or whether the shutter speed of the camera is within an appropriate range is determined. In addition, the image may be divided into subareas and the same determination as described above may be made on the partial areas. Specifically, when the image is divided horizontally into three subareas and is divided vertically into two subareas, if an upper left area has a high average luminance value, shows a bimodal feature, and contains few high-frequency components, it indicates that a light source, such as the sun, is present in the sky above on the left side in the field of view and overexposure has occurred. In addition, when the image is divided similarly, if a lower area shows greater luminance dispersion and contains high frequency components, it indicates that an image of the ground plane part including a traveling area is properly captured. Observing a change in these states allows detection of a change in the exposure state.

Acquisition of an adjustment value or the like in the imaging device is achieved by receiving a value corresponding to a necessary identification number (ID) among values flowing in the in-vehicle network, such as CAN, and accumulating the received value in a buffer or the like.

<Imaging Device Characteristics Estimation Unit 113>

The imaging element has sensitivity variations because of its non-uniformity of sensitivity to photons (PRNU), non-uniformity of dark current (DCNU) under set operating conditions, and the like. In addition to this, a dark current value changes depending on temperatures. For this reason, the imaging device characteristics estimation unit 113 measures a dark current or a current under a uniform light source, based on image data or the like received from the image acquisition unit 101, thereby making sensitivity measurements in advance and stores its results. Because the dark current has temperature dependency as described above, a sensitivity measurement result for each temperature may be recorded at the time of measurement.

Similarly, the imaging device characteristics estimation unit 113 measures and records in advance a signal noise ratio (SN ratio) of a signal flowing through the imaging element. In addition, geometric characteristics of the lens, such as a blur amount and a distortion amount of the imaging device 11, and color correction characteristics, such as an output characteristic for a white balance adjustment value and an output characteristic for a gain adjustment value, may also be recorded. These data can be calculated and recorded at timing of camera calibration.

For example, when a target of a known shape and size, a linear object boundary, or the like is observed in the field of view of the camera, a blur amount and a distortion amount are determined by calculating an extent of observational spreading of the target and the boundary to surrounding pixels and an extent of observational distortion of the same to surrounding pixels in an acquired image, and the determined blur amount and distortion amount are expressed as MTF curves, internal parameters, or the like. Because the size of the blur amount and the distortion amount changes depending on an aperture open degree, the blur amount and the distortion amount for each aperture open degree may be recorded.

Characteristics related to the white balance and the gain can be measured and recorded in advance. The way they are observed under each illuminance may be recorded using color charts, etc. These characteristics may be recorded as to the entire image-capturing area, or may be recorded for each of properly divided areas, such as 4 subareas or 9 subareas.

Based on the above-mentioned sensitivity measurement results recorded in advance, a dark noise level in the environment in which the vehicle is actually traveling can be estimated. For example, because of the dark current's dependency on temperature, a ratio of the dark current to an output current at the time of image-capturing in the traveling environment can be calculated. Specifically, a table showing a correspondence relationship between the temperature and the dark current is stored in the imaging device characteristics estimation unit 113, and the table is referred to, based on a measured temperature. This allows calculation of the SN ratio of a signal flowing through the imaging element. In addition, it is possible to estimate the illuminance of the image-capturing environment from an illuminance value average of an acquired image and estimate a color tone correction parameter with white balance characteristics taken into consideration. It is also possible to estimate a blur amount and a distortion amount in the environment where the vehicle is actually traveling, based on an aperture open degree at the time of image-capturing, the aperture open degree being received from the imaging device state estimation unit 112.

<Parameter Generation Unit 114>

Based on output results from the imaging device state estimation unit 112, the imaging device characteristics estimation unit 113, and the recognition model generation unit 102, the parameter generation unit 114 calculates image-capturing correction parameters for correction of one or more of a shutter open time, an aperture open degree, and image signal processing and calculates an influence on a recognition result from the recognition model generation unit 102 as well.

Hereinafter, some examples of a method of calculating the image-capturing correction parameters for correction of the shutter open time, the aperture open degree, and the image signal processing, which are image-capturing conditions, will be described.

An image-capturing correction parameter for correction of the shutter open time is calculated as a parameter for correcting current values to put them distributed in a certain range, the current values being obtained from photometric points set across the entire screen or at a plurality of points in the screen. Specifically, when a median Vmid of a current value obtained under setting of a certain shutter open time T1 is present between a threshold THRmin and a threshold THRmax that are set in advance, it is determined that correction is unnecessary and therefore the shutter open time T1 in its original state is outputted. When the obtained median Vmid is smaller than the threshold THRmin, T1+$\Delta$T is outputted to increase the shutter open time, thus increasing the current value. Conversely, when the current value is larger than the threshold THRmax, T1−$\Delta$T is outputted to reduce the shutter open time, thus reducing the current value. $\Delta$T is a predetermined constant, and each of the thresholds THRmax and THRmin may be set at a plurality of threshold levels.

The method of using the photometric points set across the entire screen or at a plurality of points in the screen has been described above. Instead of carrying out this method, however, the shutter open time may be outputted so that current values obtained from an image area or photometric points included in an area where a recognition target outputted by the recognition model generation unit 102 is present are distributed in a certain range.

In calculation of the aperture open degree, an aperture open degree A is set in the following manner. When the above shutter open time T1 is an output value equal to or smaller than a predetermined threshold Tmax0 and a current value C is equal to or larger than a predetermined threshold Cthr0, a parameter that makes the aperture open degree A smaller than the current aperture open degree is outputted. When the above shutter open time T1 is an output value equal to or larger than a predetermined threshold Tmax1 or the current value C is equal to or larger than a predetermined threshold Cthr1, a parameter that makes the aperture open degree A larger than the current aperture open degree is outputted. In this process, Tmax0<Tmax1 and Cthr0<Cthr1 holds. Tmax1 and Cthr1 in this process are set as sufficiently large values. For example, these thresholds are set so that the aperture open degree becomes the maximum in the daytime, a cloudy weather, or the outdoor environment. As a result, the aperture open degree is normally kept at its maximum and is reduced when a light source, such as the sun, is in the field of view. This makes it possible to reduce blurring of the target object that results from movement of the vehicle during image-capturing.

Image-capturing correction parameters for correction of the image signal processing include, for example, one or more of a smoothing parameter, an edge enhancement parameter, a white balance correction parameter, offset correction/gain correction parameters, and a gamma correction parameter. Hereinafter, a method of calculating these parameters will be described.

In calculation of the smoothing parameter, a process and a parameter for smoothing an image are set in accordance with a dark noise level estimated by the imaging device characteristics estimation unit 113. For example, when an SN ratio related to dark noise is sufficiently large (when an SN ratio is equal to or larger than a threshold Dthr1), it is determined that noise elimination is unnecessary and therefore no smoothing process is carried out. When the SN ratio is smaller than the threshold Dthr1 and is equal to or larger than a threshold Dthr2, an averaging process in a range of 3×3 pixels is carried out. When the SN ratio is smaller than the threshold Dthr2 and is equal to or larger than a threshold Dthr3, a median process in a range of 3×3 pixels is carried out. When the SN ratio is smaller than the threshold Dthr3, the median process in a range of 5×5 pixels is carried out. In this manner, the process and the parameter for smoothing the image are switched so that a stronger noise elimination process is carried out as the SN ratio gets smaller. The above thresholds have a relationship of Dthr1>Dthr2>Dthr3 such that each larger threshold is several times as large as each smaller threshold.

In calculation of the edge enhancement parameter, a process and a parameter for sharpening an image are set in accordance with a blur amount estimated by the imaging device characteristics estimation unit 113. For example, an unsharp mask process or the like is generally known as a technique for sharpening an image (enhancing an edge). The unsharp mask process is a method of sharpening an original image by blurring the original image according to a certain Gaussian distribution pattern and subtracting the blurred image from the original image. In this method, a kernel size and a Gaussian filter coefficient used as parameters are switched to make parameter adjustment such that sharpening gest stronger as the blur amount increases.

The white balance correction parameter is calculated using a Gray World algorithm. The Gray World algorithm generally used for white balance correction is an algorithm based on a statistical fact that averaging all colors in the screen produces a color close to an achromatic color. This algorithm sets a white balance gain such that average signal levels of R (red), G (green), and B (blue) colors in the screen become equal to each other. A known color chart or the like is photographed and a white balance gain is recorded in advance. This allows comparison between the recorded white balance gain and a white balance gain obtained in the environment in which the vehicle is actually traveling, and from a comparison result, the white balance correction parameter can be obtained. There may be a case where the white balance correction parameter changes under the influence of an illumination environment. To address this case, white balance correction parameters in a plurality of illumination environments, e.g., white balance correction parameters in a case of changing the intensity or type of a light source may be recorded, and the white balance correction parameter may be switched, depending on which illumination environment of the plurality of illumination environments an illumination environment of an image acquired during the vehicle's traveling is close to.

The offset correction/gain correction parameters are parameters for correcting a correspondence relationship between a current amount and a luminance value when the current amount, which is generated according to the amount of photons received by the imaging element, is converted into the luminance value of each pixel of an image. When an amount of current inputted to a pixel is V0, a luminance value outputted is I0, an offset value (offset correction parameter) is C0, and a gain value (gain correction parameter) is G0, I0=G0×V0+C0 holds. At this time, because the amount of received photons and the amount of generated current do not have an accurate proportional relationship because of a manufacturing error of the imaging element, I0=G0×V0 C0+L(V0) may be set, where L (V) denotes a lookup table for correcting an error corresponding to the amount of current V. C0, G0, and L (V) can be determined by photographing a known chart or the like in advance and recording output values listed thereon.

The gamma correction parameter is a parameter for adjusting allocation of luminance values of pixels to be outputted so that an object to be observed can be expressed with sufficient gradations in each of luminance areas, such as a low luminance area, an intermediate luminance area, and a high luminance area. In general, when an image-capturing result of a camera is outputted as an image, the gradations need to be expressed in terms of finite numbers of bits per pixel, such as 8 bits, 10 bits, 12 bits, 24 bits, and 32 bits. For example, when a part or the whole of a recognition target outputted by the recognition model generation unit 102 is present in the low luminance area in the screen and the number of gradations of a luminance value included in the area is equal to or smaller than a certain threshold value Gthr, a gamma correction parameter value is reduced to increase the number of gradations allocated to the low luminance area. When a luminance value of an input image is I1, a luminance value of an output image is I2, and a gamma correction parameter value is γ, I2/C=(I1/C)^γ holds. In this equation, C denotes a constant for normalizing a luminance value range to keep the luminance value between 0 and 1, and ^ is an operation symbol representing a power.

As described above, the imaging device state estimation unit 112 estimates events occurring in the imaging device 11 due to an external factor, and the imaging device characteristics estimation unit estimates a dark current, based on temperature measurements, estimates an SN ratio related to the estimated dark current, estimates the illuminance of an image-capturing environment, using a luminance value average of an acquired image, estimates a color tone correction amount with a white balance taken into consideration, and estimates a blur amount and a distortion amount, using an aperture open degree at the time of image capturing, according to the estimated events. Then, based on the resulting estimated values, the parameter generation unit 114 generates image-capturing correction parameters for correcting the shutter open time, the aperture open degree, and the image signal processing, which are image-capturing conditions.

Specifically, even in a situation where the environment around the imaging device 11 continues to change, such as a situation where the vehicle equipped with the imaging device 11 is moving, the image-capturing conditions are corrected in real time by the above-described process, so that an image can be acquired constantly under the optimal image-capturing conditions.

The image-capturing correction parameters for correcting the shutter open time, the aperture open degree, and the image signal processing can be calculated by the above-described calculation method. However, because these parameters mutually affect each other, there may be a case where one parameter to be applied needs to be determined as a range in which the recognition performance of each environment recognition unit 111 is stabilized, which range will be described below, is taken into consideration.

Figure 3:
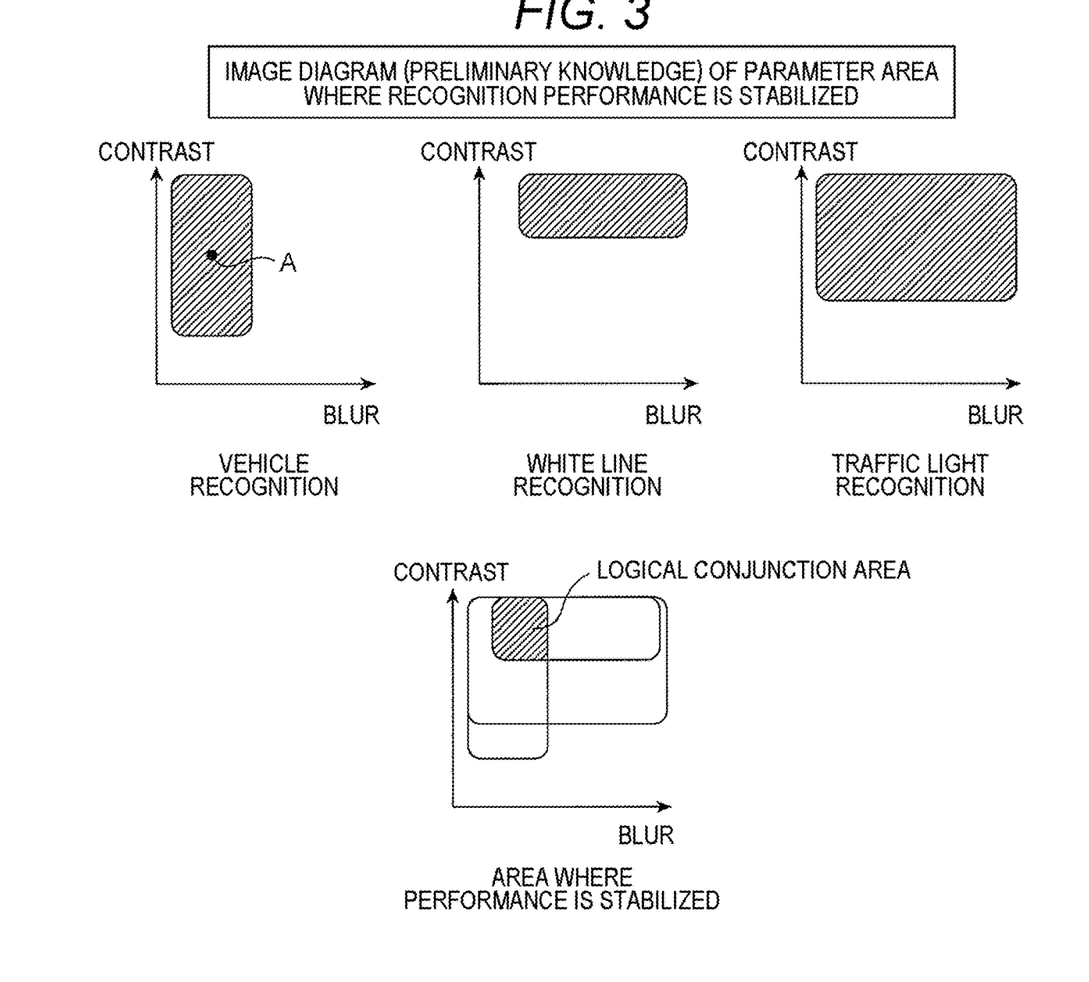
FIG. 3 is a schematic diagram 1 of parameter ranges in which a recognition function of an imaging device is stabilized.

Specifically, as ranges in which the recognition performance of each environment recognition unit 111 is stabilized, parameter ranges as shown in FIG. 3, in which the recognition performance is stabilized, are stored in advance in the state estimation unit 103 (hatched portions in FIG. 3). Then, each parameter is determined so that image-capturing conditions for the imaging device 11 are within the areas in which the recognition performance is stabilized.

For example, when a vehicle recognition function is assumed as one of the environment recognition units 111, a contrast range in which the recognition performance of vehicle recognition is exerted well is relatively wide but a blur range allowed is relatively narrow, as shown in FIG. 3. These ranges can be obtained as a result of a process by which, when the vehicle recognition function is created, that is, when an image for learning and train data are inputted to a vehicle recognition algorithm to subject it to a machine learning process, what contrast range and what image blur range are learned by the algorithm is determined.

From the viewpoint of vehicle recognition, the following processes are carried out to optimize the image-capturing conditions for the imaging device 11. First, the environment recognition unit 111 makes vehicle recognition on an image acquired during the vehicle's traveling, calculates a contrast and a blur in an image area recognized as an area where the vehicle is present, and calculates positioning for a contrast range and a blur range. Then, image-capturing correction parameters for correcting the shutter opening time, the aperture open degree, and the image signal processing are calculated so that an image-capturing point is directed to a position at which the recognition performance is considered to be most stable, that is, the central point of the contrast range and the blur range (a point A in the hatched area). In addition, whether a recognition result of the recognition model generation unit 102 is improved, that is, whether the image-capturing point has actually moved closer to the position of the point A by the correction is recorded.

Specifically, for example, when a contrast at the central point of the contrast range is larger than a contrast in the recognized image area, an image-capturing correction parameter is calculated so as to further increase the contrast in the area. Specifically, one or more of these processes are carried out: reducing THRmin to increase ΔT to extend the shutter open time; increasing a threshold Tmax to increase the aperture open degree; increasing the gain value G0 for gain correction; and changing the gamma value for gamma correction.

In addition, whether the performance stabilization range for each environment recognition unit 111 changes as an influence on the recognition result of the recognition model generation unit 102 is determined. Specifically, in this case, whether the image-capturing point moves closer to or moves away from the contrast range and the blur range, in which the recognition performance is stable, is determined, and based on a determination result, either an expectation of performance improvement or an expectation of performance drop is outputted.

When the above adjustment is carried out simultaneously at the plurality of environment recognition units 111, the above-described process is carried out on the logical conjunction of the parameter ranges, that is, an overlapping area thereof. In this case, an influence on the recognition result of the recognition model generation unit 102, the influence being calculated, differs depending on the type of the environment recognition unit 111.

With regard to the performance stabilization range of the environment recognition unit 111, the contrast range and the blur range may not be obtained from the inputted image for learning and training data. Instead, an image for evaluation may be inputted to the vehicle recognition algorithm having finished with its training and the contrast range and the blur range may be obtained from a result indicating whether the algorithm is successful in recognizing the inputted image.

Figure 4:
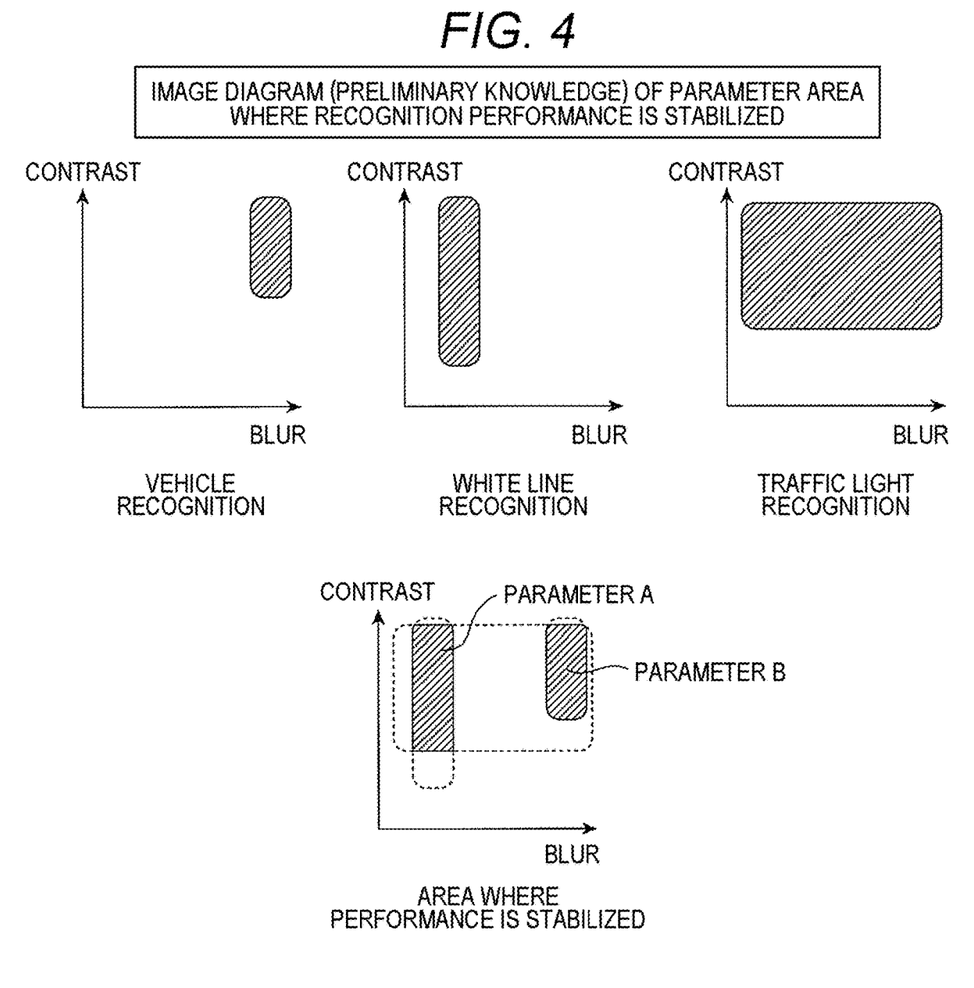
FIG. 4 is a schematic diagram 2 of parameter ranges in which the recognition function of the imaging device is stabilized.

FIG. 3 shows a case where, for example, an area of the recognition performance of vehicle recognition being stable, an area of the recognition performance of white line recognition being stable, and an area of the recognition performance of signal recognition being stable have a logical conjunction (an area where these three areas overlap). However, there may be a case in which an area where parameter ranges for recognition performance stabilization overlap is not present, as shown in FIG. 4. In such a case, image-capturing may be performed with parameters that vary depending on image acquisition timing. Specifically, points of execution of image-capturing are divided into odd points of execution of image-capturing and even points of execution of image-capturing, and a parameter is determined from a parameter A area at the odd points of execution of image-capturing, whereas a parameter is determined from a parameter B area at the even points of execution of image-capturing. Alternatively, a parameter area to be used may be changed in accordance with an execution cycle of the environment recognition unit 111.

<Parameter Stabilization Unit 115>

When each image-capturing correction parameter is calculated by the above-described calculation method and is fed back to the imaging device 11 to execute image-capturing, there is a possibility that hunting occurs. For example, when an image taken at a certain point of time is darker than an image suitable for the environment recognition unit 111, to acquire a brighter image, an image is taken with a longer shutter open time. However, when the obtained image is then too brighter than the image suitable for the environment recognition unit 111, to acquire a darker image, an image is taken again with a shorter shutter open time. This process could be repeated cyclically in a short time. In other word, a calculated parameter fluctuates under certain specific conditions, in which case the recognition performance may not be stable. To deal with this problem, the parameter stabilization unit 115 accumulates image-capturing correction parameters calculated by the parameter generation unit 114 along the time series axis, monitors fluctuation cycles of the parameters, and when detecting an output parameter's fluctuating at a cycle higher than a certain cycle, reduces the variation of the parameter.

Specifically, for example, when a shutter open time at time t1 is Tt1, the same at time time t2 is Tt2, . . . and the same at time tn is Ttn, a change cycle of the shutter open time is determined by Fourier transform or the like performed on shutter open times within a most recent fixed time. When the calculation result shows a high frequency equal to or higher than a threshold, a shutter open time to be outputted can be given by expressing a parameter calculated by the parameter generation unit 114, as a time-series moving average of, for example, {Tt(n−1)+Ttn}/2.

<Content of Process Carried Out by Image Recognition System 10>

The content of a process carried out by each unit according to this embodiment will then be described, using a flowchart.

Figure 5:
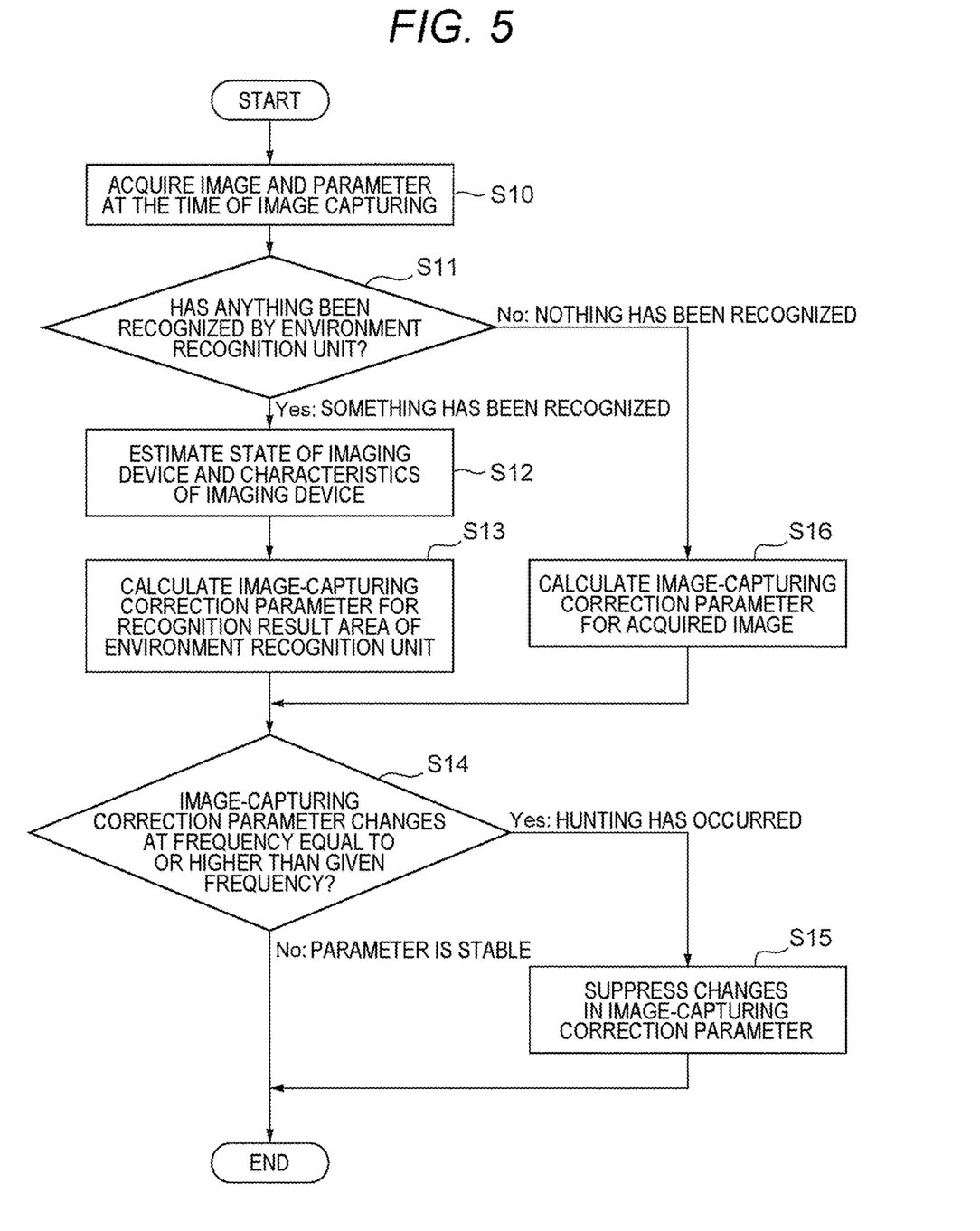
FIG. 5 is a flowchart showing a flow of processes carried out by the image recognition system according to the present invention.

FIG. 5 is a flowchart showing the content of a process carried out by the image recognition system10 of the first embodiment.

The image recognition system 10 acquires an image and image-capturing parameters from the imaging device 11 (S10). This step is generally executed as follows. Following completion of image-capturing, the imaging device 11 sends signals serving as a base point of transfer, such as a synchronization signal, an interrupt signal, and a data transfer start signal, to the image recognition system 10, and based on timing of reception of these data, the image recognition system 10 starts its data acquisition process and sequentially stores incoming data in the memory.

After completion of data acquisition, the recognition model generation unit 102 executes an image recognition process. When the result of the image recognition process indicates something is recognized (Yes at S11), an image-capturing correction parameter calculation process and the like, which are subsequent processes, are executed on an area where something is recognized. When nothing is recognized (No at S11), the image-capturing correction parameter calculation process and the like, which are subsequent processes, are executed on the whole screen.

In a process of estimating a state of the imaging device and characteristics of the imaging device (S12), the above-described estimation process by the imaging device state estimation unit 112 and the imaging device characteristics estimation unit 113 is executed.

In a process of calculating an image-capturing correction parameter for a recognition result area of a recognition environment (S13), an image-capturing correction parameter calculation process by the parameter generation unit 114 is executed in accordance with a recognition result area determined by the recognition model generation unit 102.

Following this image-capturing correction parameter calculation process, frequency components indicated in a result of accumulation of image-capturing correction parameters within a certain period of time are obtained. When parameter fluctuations at a frequency equal to or higher than a given frequency is detected (Yes at S14), the occurrence of hunting is determined, in which case, to stabilize the parameter, the parameter stabilization unit 115 suppresses the hunting by a method of, for example, taking an average of the current output value and the previous output value (S15).

At this time, in the above-described case where there is no area in which parameter ranges of recognition performance being stable overlap and therefore an image is taken multiple times with different parameters, the parameter generation unit 114 may carry out frequency calculation for each parameter.

When the recognition model generation unit 102 executes the image recognition process and its recognition result indicates nothing is recognized (No at S11), the image-capturing correction parameter calculation process is executed on the entire area of an acquired image.

As described above, according to the image recognition system of the present invention, by optimizing a condition for an imaging device at the time of image acquisition in adaptation to an environment in which image recognition performance appears, the accuracy of image recognition can be improved.

Second Embodiment

Figure 6:
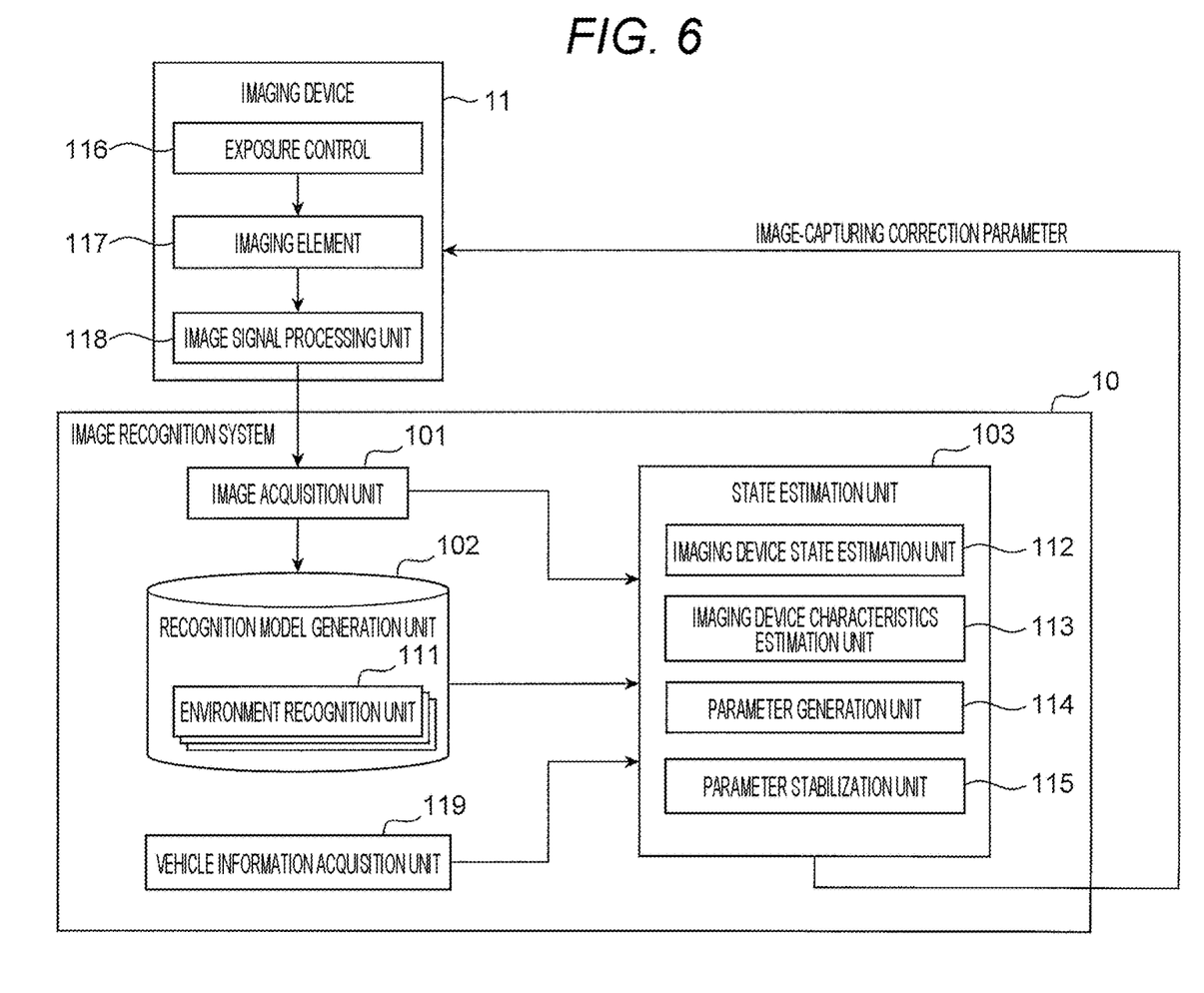
FIG. 6 is a block configuration diagram showing a connection relationship between functional blocks of an image recognition system according to a second embodiment.

FIG. 6 is a block diagram for explaining an image recognition system 10 according to a second embodiment of the present invention. In the same manner as the image recognition system 10 of the first embodiment, the image recognition system 10 of the second embodiment is connected to the imaging device 11 via a wired or wireless network, receives image-capturing data and image-capturing parameters from the imaging device 11, and transmits image-capturing correction parameters to the imaging device 11. The image recognition system 10 of the second embodiment, however, is provided on the assumption that the imaging device 11 is incorporated in a traveling vehicle, such as an automatic traveling vehicle, and is different from the image recognition system 10 of the first embodiment in that the image recognition system 10 of the second embodiment further includes a vehicle information acquisition unit 119.

Hereinafter, details of each unit will be described as description of parts overlapping those described in the first embodiment are omitted on a necessary basis.

The image acquisition unit 101 and the recognition model generation unit 102 of the second embodiment are the same as those of the first embodiment, and are therefore omitted in further description.

<Vehicle Information Acquisition Unit 119>

The vehicle information acquisition unit 119 acquires information on a vehicle speed and a turn angle of a vehicle equipped with the imaging device 11, via a network such as CAN. When these pieces of information are combined with information on an angle of view of a camera and on a mounting position and a position of the camera on the vehicle, and a vehicle model, such as an Ackermann model, is considered, a change in the field of view of the camera that results from behavior of the vehicle can be estimated. Various existing techniques for making this estimation are known, and any one of these techniques can be used preferably as an estimation method.

<State Estimation Unit 103>

In the same manner as in the first embodiment, the state estimation unit 103 receives image data and the like from the image acquisition unit 101 and receives a recognition result and the like from the recognition model generation unit 102, and transmits an image-capturing correction parameter to the imaging device 11. The state estimation unit 103 includes one or more of the imaging device state estimation unit 112, the imaging device characteristics estimation unit 113, the parameter generation unit 114, and the parameter stabilization unit 115, as internal units. Among these units, the parameter generation unit 114 is different in operation from the parameter generation unit 114 of the first embodiment and therefore will be the main focus of description.

<Parameter Generation Unit 114>

The parameter generation unit 114 of the second embodiment calculates an image-capturing correction parameter and an influence on a recognition result of the recognition model generation unit 102, based on results of the imaging device state estimation unit 112, the imaging device characteristics estimation unit 113, and the recognition model generation unit 102 and on output from the vehicle information acquisition unit 119.

As described above, the vehicle information acquisition unit 119 can estimate a change in the field of view of the camera. This embodiment thus offers a feature that an area not used at the time of parameter calculation, the area being among areas where a recognition target is present, is determined as whether the recognition target, which is included in an image outputted by the recognition model generation unit 102, is near the center of the screen, near the outer peripheral part, or outside a turn range is taken into consideration.

Specifically, a threshold for determining an outer peripheral area, the threshold being determined depending on a speed V, is set Ethr (V), and a recognition target whose areal center is within a range Ethr (V) distant to the outer peripheral part of the screen is not treated as a recognition target in the parameter generation unit 114. Likewise, when a turn angle is θ and the speed is V, a threshold for determining outside of a turn range is set Othr (θ, V), and, in the same manner as described above, a recognition target whose areal center is within the range Ethr (V) distant to the outer peripheral part of the screen is not treated as a recognition target in the parameter generation unit 114.

As a result, when the vehicle is traveling or making a turn, generation of a parameter adapted to a target that quickly goes out of the field of view and disappears, the target being among recognition targets included in a captured image, is prevented, and a parameter adapted to a target present at the center of the screen or in the direction of traveling can be calculated.

As described above, according to the image recognition system of the present invention, by optimizing a condition for an imaging device at the time of image acquisition in adaptation to an environment in which image recognition performance appears, the accuracy of image recognition can be improved.

The embodiments of the present invention described above offer the following effects.

(1) An image recognition system of the present invention includes: an image acquisition unit that includes a processor and a memory, the image acquisition unit acquiring an image taken by an imaging device; a recognition model generation unit including at least one environment recognition unit, the recognition model generation unit recognizing an image by at least one environment recognition unit and generating a recognition model; and a state estimation unit that estimates a state of the imaging device and a characteristic of the imaging device, the characteristic corresponding to the state, based on the image and the recognition model. The state estimation unit generates an image-capturing correction parameter for correcting an image-capturing condition for the imaging device, based on at least one of the estimated state, the estimated characteristic, and the recognition model.

According to the above configuration, even if an image-capturing environment changes due to traveling of a vehicle, weather condition changes, or the like and the state and the characteristic of the imaging device change as a consequence, these changes can be monitored in real time and parameter correction can be made, and therefore a condition for the imaging device at the time of image acquisition can be optimized to improve the accuracy of image recognition.

(2) The state estimation unit includes an imaging device state estimation unit that estimates a state of the imaging device, the state including at least one of a state of raindrops sticking to or haze covering a condenser element of the imaging device, a state of a shield being present between the imaging device and an image-capturing target, and an exposure state; an imaging device characteristics estimation unit that estimates characteristics of the imaging device, the characteristics including at least one of an imaging element characteristic, a lens characteristic, and a color correction characteristic of the imaging device; and a parameter generation unit that generates an image-capturing correction parameter, based on at least one of an estimated state, an estimated characteristic, and the recognition model. This makes it possible to accurately grasp each of states and characteristics inside and outside the imaging device and to generate parameters for correcting those states and characteristics.

(3) The recognition model generation unit generates a recognition model by recognizing an area where an image-capturing target is present, and the state estimation unit generates an image-capturing correction parameter for each area where the image-capturing target is present, the each area being present on the recognition model. As a result, even when a plurality of recognition targets are present in an acquired image, the present invention can be applied preferably to each of the targets.

(4) The image recognition system further includes a parameter stabilization unit that when an image-capturing correction parameter generated by the parameter generation unit develops a hunting phenomenon, suppress the hunting phenomenon to stabilize the image-capturing correction parameter. As a result, even when the generated image-capturing correction parameter develops a hunting phenomenon, the parameter can be stabilized, and therefore a case where behavior of the imaging device becomes unstable can be prevented.

(5) In a case where a plurality of image-capturing conditions to be corrected are present, the image-capturing conditions to be corrected are switched at each round of image-capturing performed a given number of times. As a result, even when parameter areas where the recognition performance of the imaging device is stable have no logical conjunction area or are present as a plurality of divided areas, optimal parameter adjustment can be carried out on each of the areas.

(6) The image-capturing correction parameter is a parameter for correcting at least one of a shutter open time, an aperture open degree, and image signal processing of the imaging device. This makes almost the entire functions of the imaging device the subject of correction, and therefore the present invention can be applied preferably to almost all of the states and characteristics of the imaging device.

(7) The image recognition system further includes a vehicle information acquisition unit that is incorporated in a vehicle and that acquires vehicle information including at least one of a vehicle speed and a turn speed of the vehicle, and the state estimation unit corrects a target area for generating an image-capturing correction parameter, based on the vehicle information. As a result, even when a recognition target appears/disappears frequently on an image because of the movement of the vehicle, a target to be actually recognized can be chosen properly. This allows a reduction in a calculation process load on the system.

It should be noted that the present invention is not limited to the above embodiments and may be subjected to various design modifications on condition that such modifications do not depart from the spirit of the present invention described in the claims. For example, the above embodiments have been described in detail for easy understanding of the present invention, and are not necessarily limited to an embodiment including all constituent elements described above. Some constituent elements of a certain embodiment may be replaced with constituent elements of another embodiment, and a constituent element of another embodiment may be added to a constituent element of a certain embodiment. In addition, some of constituent elements of each embodiment can be deleted therefrom or add to or replaced with constituent elements of another embodiment.

REFERENCE SIGNS LIST 10 image recognition system
102 recognition model generation unit
103 state estimation unit
112 imaging device state estimation unit
113 imaging device characteristics estimation unit
114 parameter generation unit
115 parameter stabilization unit
119 vehicle information acquisition unit

The invention claimed is:

1. An image recognition system comprising:
an image acquisition unit that includes a processor and a memory, the image acquisition unit acquiring an image taken by an imaging device;
a recognition model generation unit including at least one environment recognition unit, the recognition model generation unit recognizing the image by at least one environment recognition unit and generating a recognition model;
a state estimation unit that estimates a state of the imaging device and a characteristic of the imaging device, the characteristic corresponding to the state, based on the image and the recognition model, wherein the state estimation unit generates an image-capturing correction parameter for correcting an image-capturing condition for the imaging device, based on at least one of the estimated state, the estimated characteristic, and the recognition model;
an imaging device state estimation unit that estimates the state of the imaging device, the state including at least one of a state of raindrops sticking to or haze covering a condenser element of the imaging device, a state of a shield being present between the imaging device and an image-capturing target, and an exposure state;
an imaging device characteristics estimation unit that estimates the characteristics of the imaging device, the characteristics including at least one of an imaging element characteristic, a lens characteristic, and a color correction characteristic of the imaging device; and
a parameter generation unit that generates an image-capturing correction parameter, based on at least one of the estimated state, the estimated characteristic, and the recognition model.

2. The image recognition system according to claim 1, wherein
the recognition model generation unit generates the recognition model by recognizing an area where an image-capturing target is present, and
the state estimation unit generates the image-capturing correction parameter for each area where the image-capturing target is present, the each area being on the recognition model.

3. The image recognition system according to claim 1, further comprising:
a parameter stabilization unit that when the image-capturing correction parameter generated by the parameter generation unit develops a hunting phenomenon, suppress the hunting phenomenon to stabilize the image-capturing correction parameter.

4. The image recognition system according to claim 1, wherein in a case where a plurality of the image-capturing conditions to be corrected are present, the image-capturing conditions to be corrected are switched at each round of image-capturing performed a given number of times.

5. The image recognition system according to claim 1, wherein the image-capturing correction parameter is a parameter for correcting at least one of a shutter open time, an aperture open degree, and image signal processing of the imaging device.

6. The image recognition system according to claim 1, wherein
the image recognition system further includes a vehicle information acquisition unit that is incorporated in a vehicle and that acquires vehicle information including at least one of a vehicle speed and a turn speed of the vehicle, and
the state estimation unit corrects a target area for generating the image-capturing correction parameter, based on the vehicle information.

* * * * *